April 3, 1945.  C. C. BENNETT  2,372,704
DYNAMOMETER
Filed July 5, 1941  3 Sheets-Sheet 1
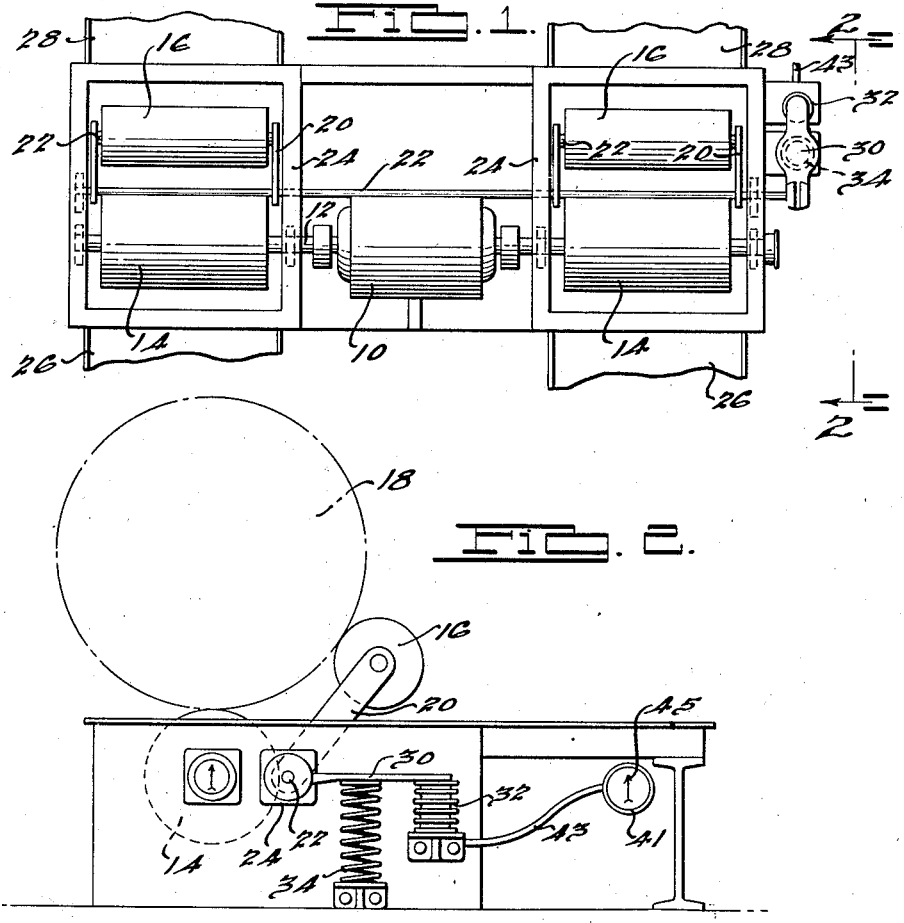
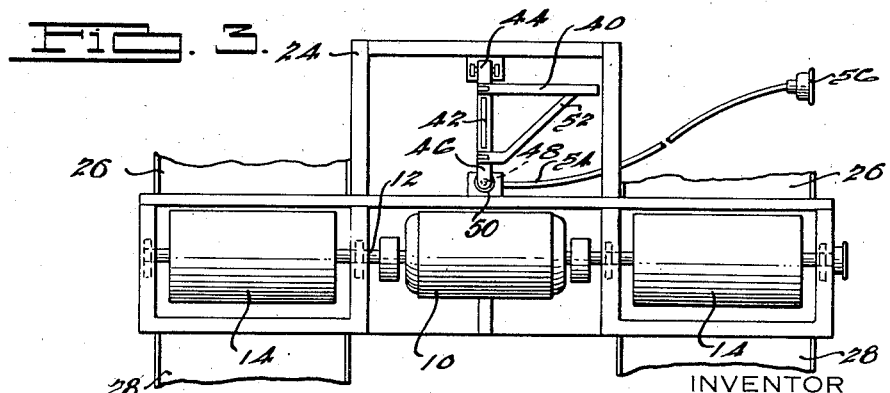
INVENTOR
Claude C. Bennett
BY Gray & Smith
ATTORNEYS.

INVENTOR
Claude C. Bennett.
BY
Gray & Smith
ATTORNEYS

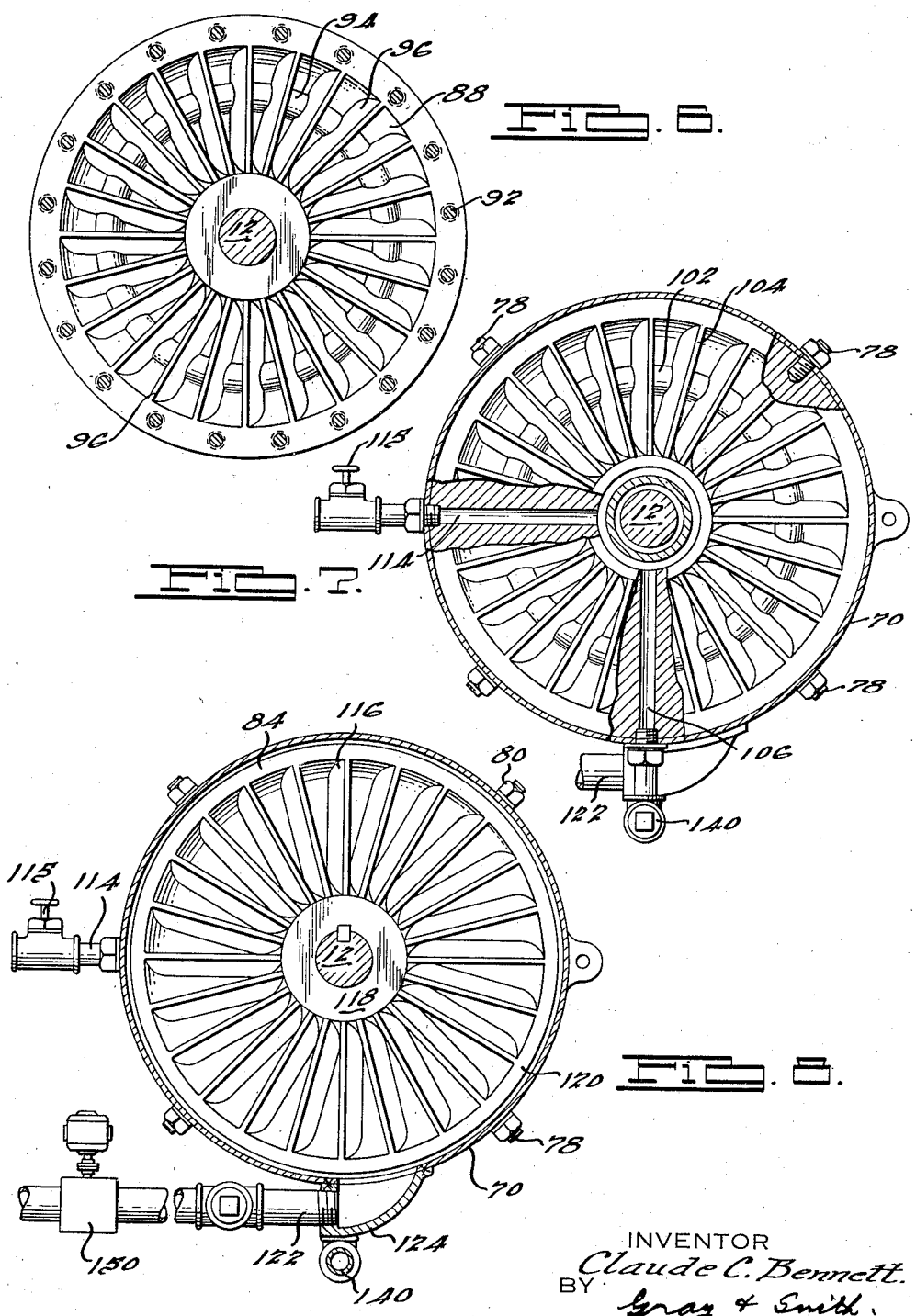

Patented Apr. 3, 1945

2,372,704

UNITED STATES PATENT OFFICE 2,372,704

DYNAMOMETER

Claude C. Bennett, South Bend, Ind.

Application July 5, 1941, Serial No. 401,169

5 Claims. (Cl. 73—134)

This invention relates to testing devices for determining the power output of engines and the force exerted to rotate a member.

The invention is illustrated as being embodied in a dynamometer which by way of example may be of water brake type wherein relatively rotatable members having fluid energizing and energy absorbing vanes are positioned to move adjacent each other to dissipate energy by the creation of heat in a liquid. The quantity of power or energy dissipated may be controlled by varying the quantity of liquid in the unit and the energy may be dissipated from the dynamometer by withdrawing heated liquid therefrom and introducing cooler liquid into the dynamometer unit thereby dissipating energy in the form of heat.

An object of this invention is to provide a dynamometer of simple design and construction which may be economically manufactured and used to accurately indicate the power developed by a prime mover.

A further object of the invention is to provide an indicator associated with a drawbar member whereby the pulling force or tractive effort exerted by a rotatable member may be measured.

Another object is to provide a dynamometer unit operably connected to a pair of spaced rotatable members adapted to receive the driving wheels of a motor vehicle in such a manner that the force developed at the driving wheels of the vehicle can be measured by an indication of the movement of a drawbar member pivotally connected to a stationary portion of the device.

A still further object resides in the provision of wheel supporting members for the driving wheels of a motor vehicle whereby wheels of varying diameter may be positioned to occupy a predetermined substantially vertical position relative to the supporting members to facilitate a test to indicate the driving power exerted by the motor vehicle.

Still another object resides in the provision of means to test the actual pulling power of a motor vehicle wherein the tractive effort of the vehicle is exerted on a drawbar member to provide a quick check-up of the power developed by the engine.

Another object of the invention resides in the provision of a dynamometer comprising a plurality of spaced stationary and rotatable members positioned in a piece of tubing in such a manner that the stationary members are locked against rotation relative to the tubing and the rotatable members are mounted on a shaft projecting into the sleeve.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a plan view of a dynamometer assembly embodying the present invention.

Fig. 2 is an end elevation taken substantially on the line 2—2 of Fig. 1, looking in the direction of the arrows.

Fig. 3 is a plan view of a dynamometer assembly embodying a modified form of the invention.

Figure 4:
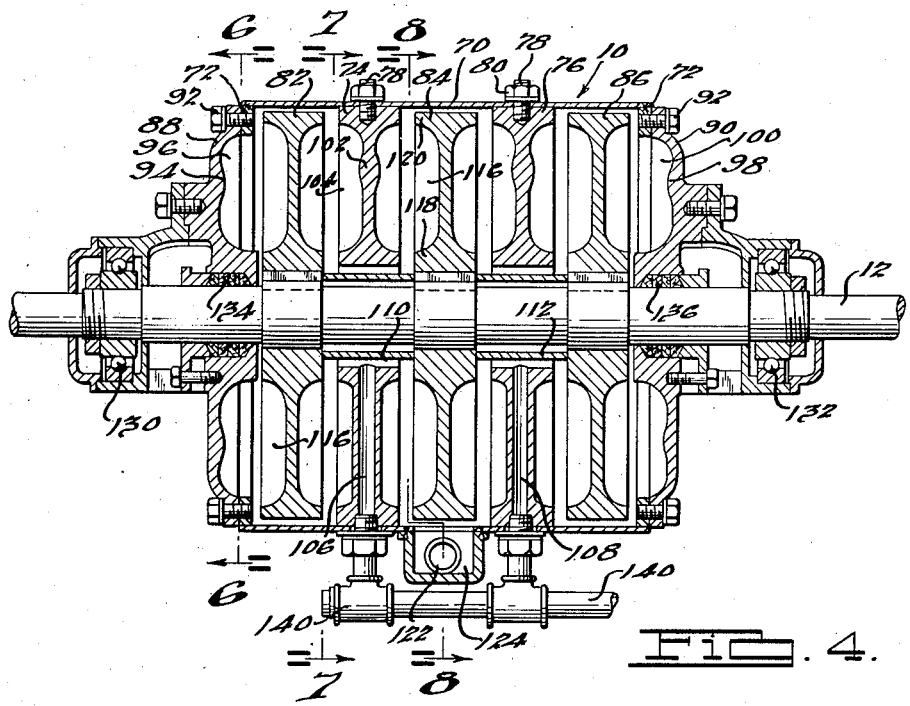
Fig. 4 is a longitudinal sectional view of a dynamometer embodying the present invention.
Figure 5:
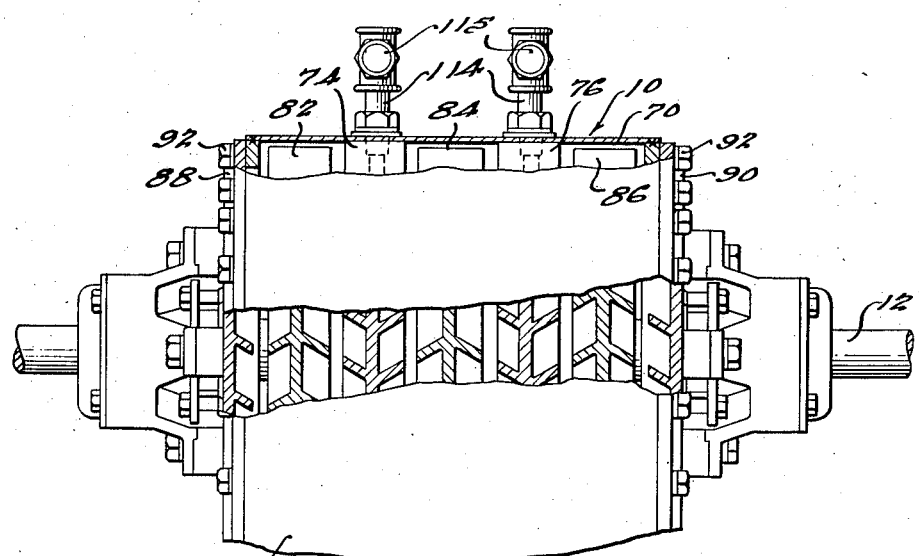
Fig. 5 is a part sectional plan view of the device illustrated in Fig. 4.

Figs. 6, 7 and 8 are sectional views taken substantially on the lines 6—6, 7—7 and 8—8 respectively of Fig. 4, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to Fig. 1, it will be observed that a dynamometer unit 10 is provided with a shaft 12 extending therethrough in opposite directions. The unit 10 has a casing which may be fixed or oscillatably mounted in suitable brackets of a framework 24. The shaft 12 is provided with a pair of driving rollers 14 positioned to receive the driving wheels of a motor vehicle. A pair of auxiliary guide rollers 16 is positioned adjacent the rollers 14 and cooperates therewith to maintain the driving wheels 18 of a motor vehicle in operative relation relative to the rollers 14. The auxiliary guide rollers 16 are carried by arms 20 fixed to shafts 22 journaled in a framework 24 in such a manner that the auxiliary rollers 16 may be oscillated about the shaft 22 to vary the angular relation of the rollers 16 relative to the rollers 14 to control the position of the driving wheels 18 on the rollers 14.

Spaced runways 26 may be provided to direct the driving wheels 18 into operative relation relative to the rollers 14 and 16. Forwardly extending runways 28 may be provided to support the front or steerable wheels of the motor vehicle at the time the driving wheels 18 are positioned on the rollers 14.

An arm 30 carried by the shaft 22 and operably connected to one of the arms 20 may engage an adjustable Sylphon member 32 to vary the position of the auxiliary rollers 16 relative to the rollers 14 and the driving wheels 18 of the vehicle. Resilient means such for example as adjustable springs 34 may be provided to yieldingly urge the arm 30 to rotate in the counterclockwise direction as viewed in Fig. 2 to yieldingly position the auxiliary rollers 16 in engagement with the driving wheels of the vehicle.

Means may be provided to give a quick indication of the pulling power or tractive effort which may be exerted by the driving wheels of a motor vehicle.

One illustrative example of such indicating means comprises a gauge 41 operably connected through a conduit 43 with the Sylphon 32 in such a manner that oscillation of the auxiliary rollers 16 and shaft 22 actuates a pointer 45 of the gauge 41.

When it is desired to give a quick indication of the pulling power developed by the prime mover of a motor vehicle, the vehicle may be driven over the runways 26 and 28 to position the driving wheels 18 between the rollers 14 and 16 as illustrated in Fig. 2.

The engine may then be operated to speed up the driving rollers 14 and when a desired speed has been attained, liquid may be introduced into the dynamometer 10 to develop therein resistance to rotation of the driving wheels 18. A portion of the force exerted to urge the driving wheels 18 off of the rollers 14 resolves itself into a component of force urging the auxiliary rollers 16, arms 20 and shafts 22 to rotate in the clockwise direction as viewed in Fig. 2. This movement is resisted by the spring 34 and Sylphon 32 engaged by the arm 30. Movement of the Sylphon 32 forces fluid through the conduit 43 to actuate the pointer 45 of the gauge 41. An indication is thus obtained of the pulling power developed by the engine of the vehicle.

Another illustrative example of a suitable indicating means is illustrated in Fig. 3. As there shown a single pair of rollers 14 is provided to receive and support the driving wheels 18 of the vehicle. A drawbar 40 pivotally mounted on a longitudinally extending horizontally disposed shaft 42 is adapted to be moved angularly about the shaft 42 to a substantially vertical position. The shaft 42 is pivoted about a horizontally extending stub shaft 44 in such a manner that the shaft 42 may oscillate about the stub shaft 44. The forward end of the shaft 42 is provided with a member 46 adapted to engage a plunger 48 mounted in a cylinder 50. A diagonally extending brace member 52 may be interposed between the forward end of the shaft 42 and the drawbar 40 to strengthen it. Liquid may be confined within the cylinder 50 to be acted on by the plunger 48 to transmit fluid pressure through a conduit 54 operably connected with a gauge 56.

To indicate the pulling power developed by the engine of the vehicle, the driving wheels 18 should be positioned on the supporting rollers 14. The drawbar 40 may then be oscillated about the shaft 42 to raise it to the vertical position. The upper end of the drawbar 40 may then be operably connected to an axle or other fixed portion of the vehicle by any suitable means such for example as by a chain.

The engine may then be speeded up and the dynamometer 10 rendered effective as by introducing liquid into it to resist rotation of the driving wheels 18. The force exerted by the driving wheels 18 tends to move the vehicle away from the drawbar 40. This force is resisted by the connecting means between the vehicle and the drawbar and results in a force being exerted to oscillate the shaft 42 about the stub shaft 44. The member 46 then exerts a force on the plunger 48 to move it in the cylinder 50 to increase fluid pressure in the conduit 54 to actuate the pointer of the gauge 56 thereby indicating the pulling power developed by the engine of the vehicle.

Referring now to Figs. 4 to 8, it will be observed that the dynamometer 10 may be formed with an outer shell 70 which may be a length of tubing or a pipe. Suitable flanges 72 may be secured at opposite ends of the casing 70 and attached thereto in any desired manner as by welding.

A plurality of spaced stationary or stator plates or members 74 and 76 may be positioned within the casing 70 and secured therein by suitable means such for example as by bolts 78 held against rotation by locking nuts 80.

The shaft 12 may have fixed thereto a plurality of spaced rotatable blades or members 82, 84 and 86 respectively interposed between the stator members 74 and 76 and spaced end plates 88 and 90 attached to the flanges 72 as by suitable studs 92.

Referring now to Fig. 6, it will be observed that the end plate 88 is formed with a convex circumferentially extending projection 94 designed to impede circulation of liquid and create turbulence therein. The end plate 88 is also formed with a plurality of radially extending angularly inclined baffles or blades 96. The end plate 90 may be provided with a similar convex projection 98 and is formed with spaced angularly inclined vanes 100 disposed in opposite relation to the vanes 96 of the end plate 88.

Referring now to Fig. 7, attention is called to the fact that each of the stator plates 74 and 76 is provided on opposite sides with annularly disposed convex radially extending portions 102 and angularly inclined vanes 104. The stator plates 74 and 76 are also provided with radially extending liquid inlet ports 106 and 108 respectively communicating with axially extending passages 110 and 112 formed in the stator members whereby liquid may be introduced into the interior of the casing 70 at spaced points. The stator plates 74 and 76 are also provided with generally horizontally extending air outlet conduits 114 whereby entrained air may be permitted to escape from the interior of the casing 70.

Referring now to Fig. 8, it will be observed that the rotor blades 82, 84 and 86 are provided with angularly inclined vanes 116 interposed between the hub portion 118 and a flange portion 120. A liquid outlet conduit 112 is threaded or otherwise suitably secured in a housing portion 124 attached to the casing 70 as illustrated in Fig. 8 whereby liquid may be withdrawn from the interior of the casing 70. The stator plates 74 and 76 do not engage the casing 70 in fluid tight relation. Water is therefore free to flow from the end sections where the rotor members 82 and 86 rotate to the liquid outlet conduit 122.

The shaft 12 may be journaled in suitable bearings 130 and 132 attached to the end plates 88 and 90 respectively. The space between the shaft 12 and the end plates 88 and 90 may be sealed by suitable packing means 134 and 136 respectively to prevent the escape of liquid from the unit.

The operation of this device is as follows: A rotating force is exerted on the shaft 12 in any suitable manner such for example as by rotation of the rollers 14 by the driving wheels 18 of a motor vehicle undergoing test. Liquid may be introduced into the liquid inlet ports 106 and 108 from a conduit 140 operably connected thereto. Liquid thus admitted to the interior of the casing 70 flows through the axially extending passages 110 and 112 and is introduced into the space between the stator members 74 and 76 and the end plates 88 and 90, and the rotor blades 82, 84 and 86. Rotation of the shaft 12 results in energizing of the liquid by the vanes 116 carried by the rotor blades 82, 84 and 86. Due to the rotation of the rotor blades liquid is thrown outwardly by the vanes 116 and by centrifugal force developed by rotation of the rotor blades. The energized liquid strikes against the stator plates 74 and 76 and the end plates 88 and 90 and is deflected radially toward the shaft 12 by the force of the energized liquid being thrown outwardly by the rotor blades. It will be noted that the vanes carried by the stator plates are disposed in opposite angular relation to the vanes carried by the rotor blades whereby considerable turbulence is caused in the unit. This turbulence is increased by the convex portions 94, 98 and 102 of the stationary members whereby energy is dissipated and transformed into heat.

The resistance developed by the unit or the energy dissipated thereby can be controlled by varying the quantity of water or liquid within the unit. The greater the quantity of liquid in the unit, the greater the energy which will be required to rotate the rotor blades to direct the liquid outwardly and cause it to be redirected inwardly in the stator plates. The entrained air may be liberated from the unit by manipulation of a control valve 115 operably connected to the conduit 114.

The liquid in the unit is heated due to the shearing or cutting action of the liquid by relative rotation of the rotor blades with reference to the stator plates. Heated liquid may be discharged from the outer peripheries of the casing 70 through the outlet conduit 122 communicating with the housing portion 124 positioned to receive liquid from the interior of the casing 70. It will be noted that the cool liquid admitted through the inlet ports 106 and 108 in the stator plates is introduced into the casing 70 near the central portion thereof, and that heated liquid is withdrawn from the casing 70 adjacent the outer periphery thereof.

Suitable valve means may be provided to control the inlet and outlet passages whereby the energy dissipated by the unit can be uniform over considerable periods of time. If desired, a power driven pump such for example as an electrically actuated pump 150 may be operably connected in the discharge conduit 122 to withdraw liquid from the unit at a constant rate of speed or at a varying speed dependent on temperature conditions of the circulating liquid within the unit.

I claim:

1. In a machine for testing the power output of the prime mover of a motor vehicle having a pair of driving wheels, a pair of spaced main rollers positioned to be driven by the vehicle driving wheels, a pair of angularly movable auxiliary rollers positioned adjacent the main rollers to be driven by the vehicle driving wheels, a power absorbing dynamometer, connecting means between said main rollers and dynamometer whereby the dynamometer may be driven by the rollers, a power indicating gauge, liquid pressure inducing means interposed between the auxiliary rollers and the gauge, and motion transmitting means actuated by angular movement of the auxiliary rollers relative to said main rollers to actuate the liquid pressure inducing means to operate the gauge and indicate power output.

2. A machine for testing the power output of the prime mover of a motor vehicle having a pair of driving wheels comprising a pair of spaced main rollers positioned to be driven by the vehicle driving wheels, a pair of angularly movable auxiliary rollers positioned adjacent the main rollers to be engaged by the driving wheels, a power absorbing dynamometer manually operable means to control the energy absorbing characteristics of the dynamometer, connecting means between the main rollers and dynamometer whereby the dynamometer may be driven by the rollers, a power indicating gauge, liquid pressure inducing means operably connected to the gauge, and motion transmitting means actuated by angular movement of the auxiliary rollers relative to said main rollers to actuate the liquid pressure inducing means to actuate the gauge to indicate the power output of the prime mover of the vehicle.

3. In a device for testing the power output of a motor vehicle having driving wheels, a pair of spaced supporting rollers positioned to receive the driving wheels, an energy absorbing dynamometer interposed between the supporting rollers, a shaft positioned adjacent the supporting rollers, spaced arms fixed to said shaft, auxiliary rollers carried by said arms, means to oscillate said shaft to position the auxiliary rollers in the path of travel of the driving wheels positioned on the supporting rollers, a gauge, liquid pressure inducing means operably connected to said gauge, and motion transmitting means between said shaft and liquid pressure inducing means whereby angular movement of said arms by forward movement of the driving wheels relative to the supporting rollers is transmitted to oscillate said shaft and actuate the pressure inducing means to indicate on the gauge the power output of the vehicle.

4. A power testing device for a motor vehicle comprising a pair of supporting rollers spaced apart to receive the driving wheels of the vehicle, a dynamometer, connecting means between the supporting rollers and the dynamometer whereby the dynamometer may be driven by the driving rollers, a pair of angularly movable auxiliary rollers positioned adjacent the supporting rollers to be engaged and moved angularly relative to the supporting rollers by the vehicle driving wheels positioned on the supporting rollers, liquid filled means positioned to be operated by angular movement of the auxiliary rollers, a gauge, connecting means between the gauge and the liquid filled means whereby angular movement of the auxiliary rollers under the influence of the driving wheels of the vehicle is transmitted through the liquid filled means to actuate the gauge to indicate power developed.

5. A power testing device for a motor vehicle comprising a supporting roller positioned to receive a driving wheel of the vehicle, a dynamometer, driving means between the supporting roller and the dynamometer, spaced arms mounted for oscillation adjacent the supporting roller, a shaft journaled in said arms, an angularly movable auxiliary roller carried by the shaft and positioned adjacent the supporting roller to be engaged and moved angularly by the vehicle driving wheel positioned on the supporting roller, liquid filled means positioned to be operated by angular movement of the auxiliary roller, a link between said arms and the liquid filled means angularly movable in response to oscillations of said arms, a gauge, connecting means between the gauge and the liquid filled means whereby angular movement of said link and auxiliary roller under the influence of the driving wheel of the vehicle is registered on the gauge to indicate power developed.

CLAUDE C. BENNETT.